(12) United States Patent
Pawlowski et al.

(10) Patent No.: US 6,260,645 B1
(45) Date of Patent: Jul. 17, 2001

(54) ELECTRIC VEHICLE WITH A MOVABLE BATTERY TRAY MOUNTED BETWEEN FRAME RAILS

(75) Inventors: James F. Pawlowski, White Lake Township; Walter W. Newgeon, Birmingham; Gerald P. Spezia, Farmington Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/298,078

(22) Filed: Apr. 22, 1999

(51) Int. Cl.$^7$ ........................................................ B60K 1/00
(52) U.S. Cl. ...................... 180/65.3; 180/65.5; 180/68.5; 322/3
(58) Field of Search .................. 180/68.5, 65.1, 180/65.3, 65.5, 65.6; 310/36; 322/3

(56) References Cited

U.S. PATENT DOCUMENTS

| | | | |
|---|---|---|---|
| 3,930,552 | * 1/1976 | Kunkle et al. | 180/68.5 |
| 4,165,098 | 8/1979 | Wagner . | |
| 4,165,099 | 8/1979 | Wagner et al. . | |
| 4,878,691 | 11/1989 | Cooper et al. . | |
| 4,934,733 | 6/1990 | Smith et al. . | |
| 4,967,864 | * 11/1990 | Boyer et al. | 180/68.5 X |
| 5,016,912 | 5/1991 | Smith et al. . | |
| 5,036,941 | * 8/1991 | Denzin et al. | 180/65.5 X |
| 5,087,229 | * 2/1992 | Hewko et al. | 180/65.5 X |
| 5,164,623 | 11/1992 | Shkondin . | |
| 5,275,430 | 1/1994 | Smith . | |
| 5,301,765 | * 4/1994 | Swanson | 180/68.5 |
| 5,468,018 | 11/1995 | Redman et al. . | |
| 5,540,297 | * 7/1996 | Meier | 180/65.5 X |
| 5,585,205 | * 12/1996 | Kohchi | 180/68.5 X |
| 5,590,734 | 1/1997 | Caires . | |
| 5,641,031 | 6/1997 | Riemer et al. . | |
| 5,839,750 | 11/1998 | Smith . | |

OTHER PUBLICATIONS

Precision Magnetic Bearing Systems Inc., "PREMAG Announces Compact Pancake Motors for Hybrid Electric Vehicles," May 4, 1998.

Dallas Smith Corp., brochure entitled "The Benefits of an Axleless Suspension Stack Up," Jan. 1998.

International Innovation Consortium, advertisement entitled "Electric Motor Wheel".

Schabmuller, Internet page entitled "Motor–In–Wheel DC Drives".

* cited by examiner

Primary Examiner—Michael Mar
(74) Attorney, Agent, or Firm—Mark P. Calcaterra

(57) ABSTRACT

A land vehicle having wholly independent multiple suspension units with integral propulsion systems. The independent suspension unit includes a self-contained return spring, dampener, motor-wheel drive mechanism with attached brake-mechanism, and rotary and linear regenerative devices. The independent suspension system does not require or use an axle. The axleless suspension is mounted to a frame rail of the vehicle, which may be formed generally straight, as there is no axle to accommodate. The vehicle frame includes side rails between which a compartment, such as a battery compartment, may be placed. The frame rails include rollers which facilitate insertion and removal of the compartment between the frame rails. The frame rails also may be formed to enable the passage of conduits, such as fluid transfer or temperature control lines, for routing fluids between the battery compartment and a thermal management system.

6 Claims, 8 Drawing Sheets

ELECTRIC VEHICLE WITH A MOVABLE BATTERY TRAY MOUNTED BETWEEN FRAME RAILS

BACKGROUND OF THE INVENTION

1. Field of the Invention

The present invention relates generally to a motor vehicle without an axle, and, more particularly to a propulsion system, a suspension system, and an energy storage system for an electric vehicle having an axleless suspension system.

2. Discussion

The great majority of vehicles today are designed to include a centralized source of propulsion and a transmission to transfer the output from the centralized source of propulsion to the drive wheels in order to propel the vehicle. While this design has proved suitable for several years, it raises several considerations which must be addressed in every vehicle. In particular, the transmission system for transferring mechanical output from the centralized source of propulsion to the individual drive wheels typically includes gear boxes, drive shafts, axles, and sometimes transfer cases. All these components add considerable weight to the vehicle, as each are typically fairly sturdily built. Further, routing these components from the centralized power source to the particular drive wheels requires considerable design effort. Interior vehicle space must often be sacrificed in order to properly route these components. Further, longitudinal frame rails of a chassis, particularly in a truck, often must be diverted from a preferred linear arrangement to accommodate these components.

Accordingly, it is an object of the present invention to provide various design improvements to a vehicle in order to substantially reduce the above-discussed design compromises.

SUMMARY OF THE INVENTION

This invention is directed to a propulsion system for driving a wheel of a vehicle without an axle. The propulsion system includes a suspension member suspended from a support member of the vehicle and an electric motor mounted to the suspension member. The electric motor has a housing. An output member has an inboard and an outboard end, and the inboard end is connected to the electric motor to drive the output member. A wheel hub connects to the outboard end of the output member, and an annular brake ring is mounted to the hub. A brake mechanism mounts to the housing for applying braking force to the annular brake ring to resist displacement of the annular brake ring and attached hub.

This invention is also directed to a suspension system for a vehicle. The suspension system includes a drive mechanism. A suspension bracket has a pivot ring and a drive housing, and the drive housing receives the drive mechanism which applies displacing force to a drive wheel. A suspension mount mounts the suspension bracket to the vehicle via the pivot ring, and the suspension mount includes a load bearing surface operatively connected to the pivot ring. A bearing ring is interposed between the load bearing surface and the pivot ring, and the bearing ring reduces friction between the load bearing surface and the pivot ring, wherein the bearing ring, the load bearing surface, and the pivot ring are formed in a generally hollow cylinder to disperse the load across a large surface area.

This invention is also directed to a second suspension system for a vehicle. The suspension system includes a suspension bracket mounted to the vehicle to enable relative rotation between the suspension bracket and the vehicle. A drive housing is coupled to the suspension bracket and receives a drive mechanism that applies displacing force to a drive wheel. A pivot shaft connects to the suspension bracket and mounts to the vehicle to enable pivotal movement of the suspension bracket about the pivot shaft, wherein the pivot shaft is mounted generally transversely to the vehicle. A return spring is coupled to the vehicle and the suspension bracket for providing a force to displace the suspension bracket in a first direction relative to the vehicle.

This invention is also directed to a vehicle including a vehicle frame formed of vertically opposed transverse members and horizontally opposed longitudinal members with respect to the vehicle. A tray is disposed between the longitudinal and transverse members. A friction reducing device is formed in the longitudinal members for supporting the tray between the longitudinal members, wherein tray may be displaced longitudinally over the friction reducing device to facilitate access to the tray, and wherein the longitudinal members are arranged so as to not obstruct displacement of the tray.

This invention is also directed to an electric vehicle including a frame for supporting the vehicle and formed of a plurality of members which are interconnected. A battery tray supports a bank of batteries for providing electrical energy for operating the electric vehicle. A plurality of temperature control fluid lines are disposed in proximity to the battery tray for controlling the temperature of the bank of batteries. A thermal management system is located remotely from the bank of batteries for supplying fluid at a predetermined temperature to the temperature control fluid lines and receiving fluid from the temperature control fluid lines. Fluid transfer lines exchange fluid between the temperature control fluid lines and the thermal management system. The fluid transfer lines are routed between the temperature control fluid lines and the thermal management system through at least one of the members.

These and other advantages and features of the present invention will become readily apparent from the following detailed description, claims and drawings.

BRIEF DESCRIPTION OF THE DRAWINGS

The drawings, which form an integral part of the specification, are to be read in conjunction therewith, and like reference numerals are employed to designate identical components in the various views:

FIG. 4 is an outboard perspective view of the housing for the electric motor assembly;

DETAILED DESCRIPTION OF THE INVENTION

Figure 1:
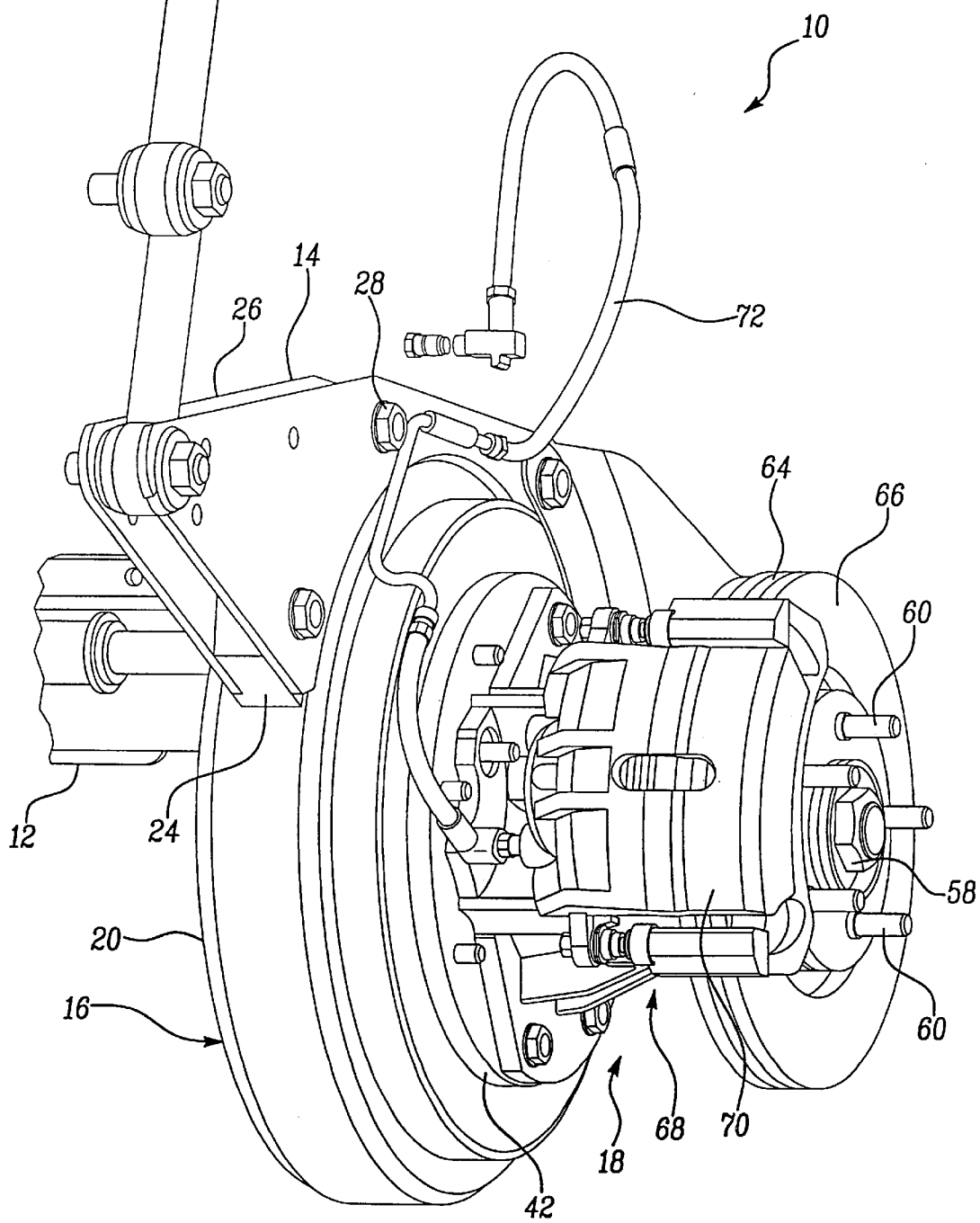
FIG. 1 is a forward perspective view of a suspension, brake, and electric motor assembly arranged in accordance with the principals of a first embodiment of the present invention.
Figure 2:
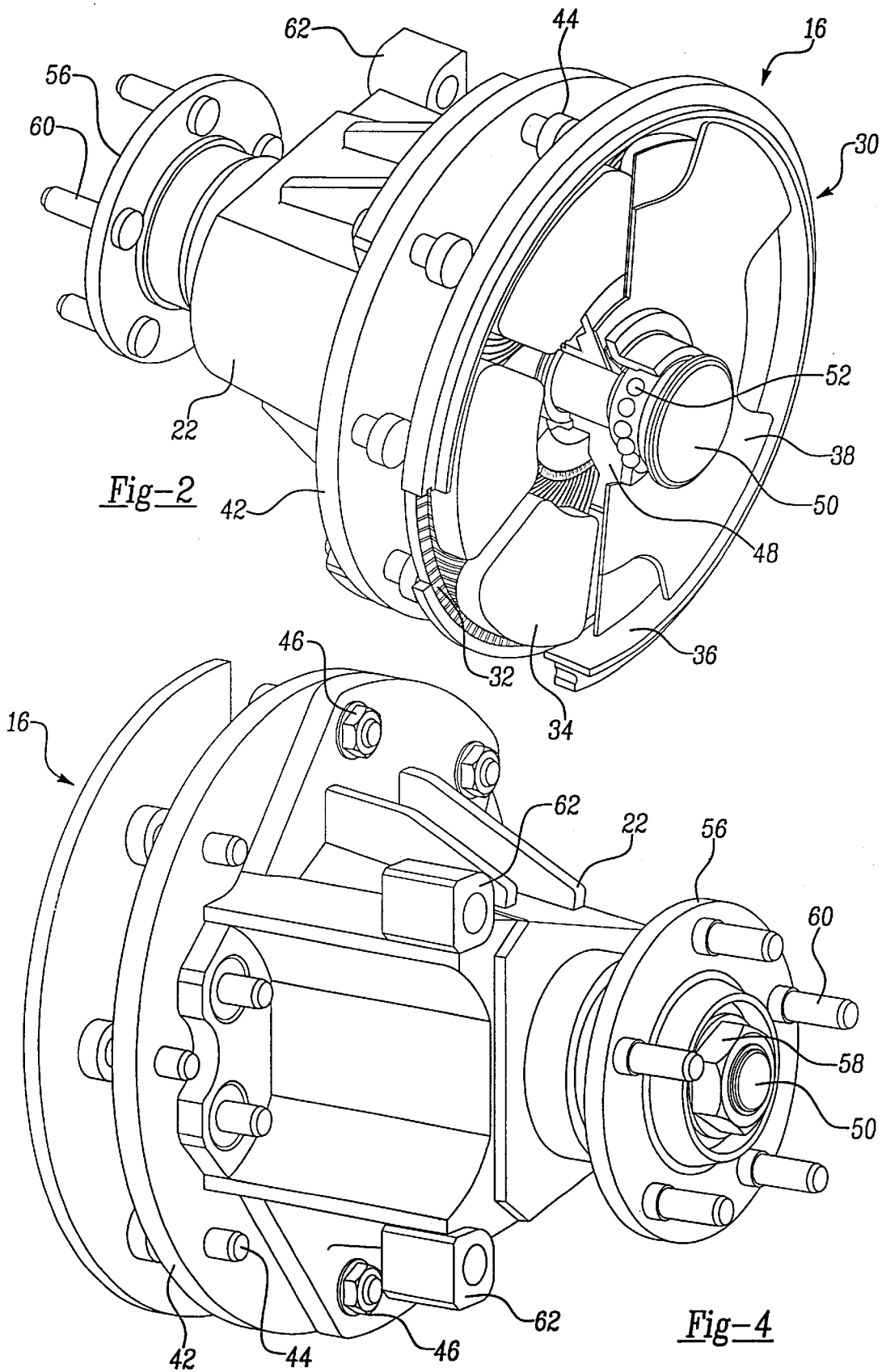
FIG. 2 is an inboard perspective view of the electric motor assembly of FIG. 1, including a partial cut-away of the motor housing to show the magnets and windings of the electric motor assembly.
Figure 3:
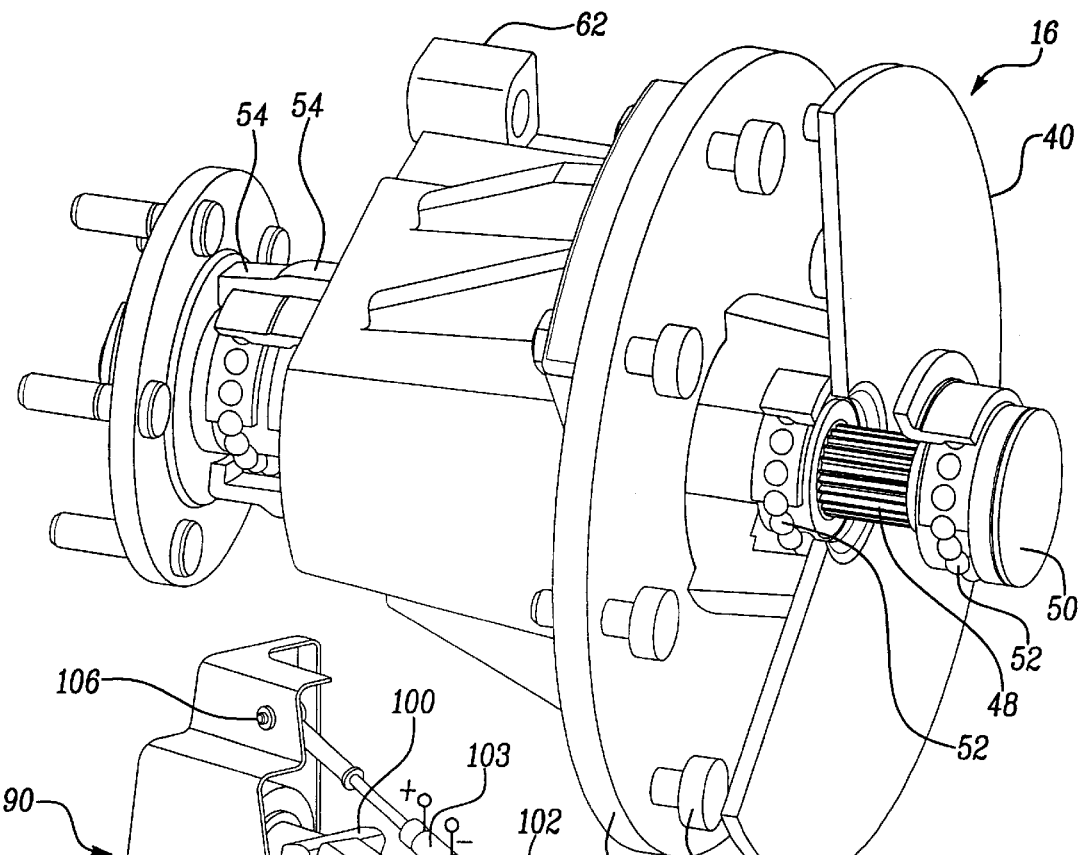
FIG. 3 is an inboard perspective view of the electric motor assembly of FIG. 1, including a partial cut-away of the motor housing and components to show inboard and outboard bearing sets and a spindle of the electric motor assembly.

FIGS. 1–4 depict a suspension system arranged in accordance with the principals of the first embodiment of the present invention. Suspension system 10 is connected to a vehicle 12 and generally comprises a motor assembly 16 and brake assembly 18 incorporated into a suspension member to control vehicle 12. Suspension system 10 includes a suspension arm or frame 14. Suspension frame 14 is attached to vehicle 12, as will be described with respect to FIGS. 5–7. Suspension frame 14 supports a motor assembly 16 and a brake assembly 18. Motor assembly 16 includes an inboard motor housing 18 and an outboard motor housing 22. Inboard motor housing 18 attaches to suspension frame 14 by a member 24 which is inserted between plates 26 and bolted using bolts or using other fasteners. It will be understood by those skilled in the art that inboard motor housing 20 and suspension frame 14 may be integrally framed as shown with respect to FIGS. 5–7.

Motor assembly 16 includes an electric motor 30 which may be embodied as a direct current (DC) traction disk armature motor. Electric motor 30 includes windings 32 which are attached to a stator portion of the motor and magnets 34 which are attached to a rotor portion of the motor. Preferably, electric motor 30 assumes a generally flat, disk-shape in order to enable suitable implementation and attachment to suspension frame 14. A stationary ring 36 defines part of the stator, and a magnetic conductor 38 provide a magnetic, conductive path for the magnetic field generated by electric motor 30. A second magnetic conductor 40 is arranged on an outboard side of electric motor 30 to provide a similar magnetic conductive path. Motor assembly 16 may also apply a regenerative braking force to enable recovery of electrical energy.

A mounting plate 42 is used to connect motor assembly 16 to inboard housing 20 using bolts or other fasteners 44. Outboard housing 22 of motor assembly 16 is in turn fastened to mounting plate 42 using a nut and bolt combination 46 or other fasteners known to those skilled in the art. Electric motor 30 engages the splines 48 of drive shaft 50 in order to provide rotational movement of drive shaft 50. A pair of inboard bearing sets 52 are journaled on an inboard end of drive shaft 50 in order to reduce rotational friction of drive shaft 50.

Returning to outboard housing 22, outboard housing 22 provides a housing for drive shaft 50 and also provides a convenient mounting bracket for brake assembly 18. With respect to drive shaft 50, outboard housing 22 includes a journal for a pair of outboard bearing sets 54 which may be internally journaled in outboard housing 22 or may be held in place by a hub 56 which may be press fit onto drive shaft 50 and held in place by a nut 58 which is threaded onto the outboard end of drive shaft 50. The outboard end of drive shaft 50 includes splines, as described with respect to reference numeral 48, and the internal diameter of hub 56 includes splines which suitably mate with splines 48 of drive shaft 50. Hub 58 includes lugs 60 to which may be mounted a drive wheel and brake discs, as will be described herein.

Outboard housing 22 also includes mounts 62. Brake assembly 18 is preferably bolted to mounts 62 so that brake assembly 16 may be interconnected to suspension system 10. Brake assembly 18 includes a pair of brake rings 64, 66 which are preferably mounted onto lugs 60 of hub 56. A caliper assembly 68 includes a caliper 70 which exerts force on brake rings 64, 66 in response to a brake input from the operator. The frictional force applied by caliper 70 operates as a retarding force to slow and eventually stop rotational movement of brake rings 64, 66, attached hub 56, and drive shaft 50, thereby providing a braking function. Brake assembly 18 is preferably a conventional caliper type brake assembly which is hydraulically operated by a fluid pressure input on brake line 72.

Suspension system 10 of FIGS. 1–4 assumes a variety of embodiments. In particular, suspension system 10 may be designed as a heavy duty suspension, such as might be implemented in a truck or off-road vehicle. Alternatively, suspension system 10 may assume a more light duty suspension system as may be implemented in a typical motor vehicle.

Figure 5:
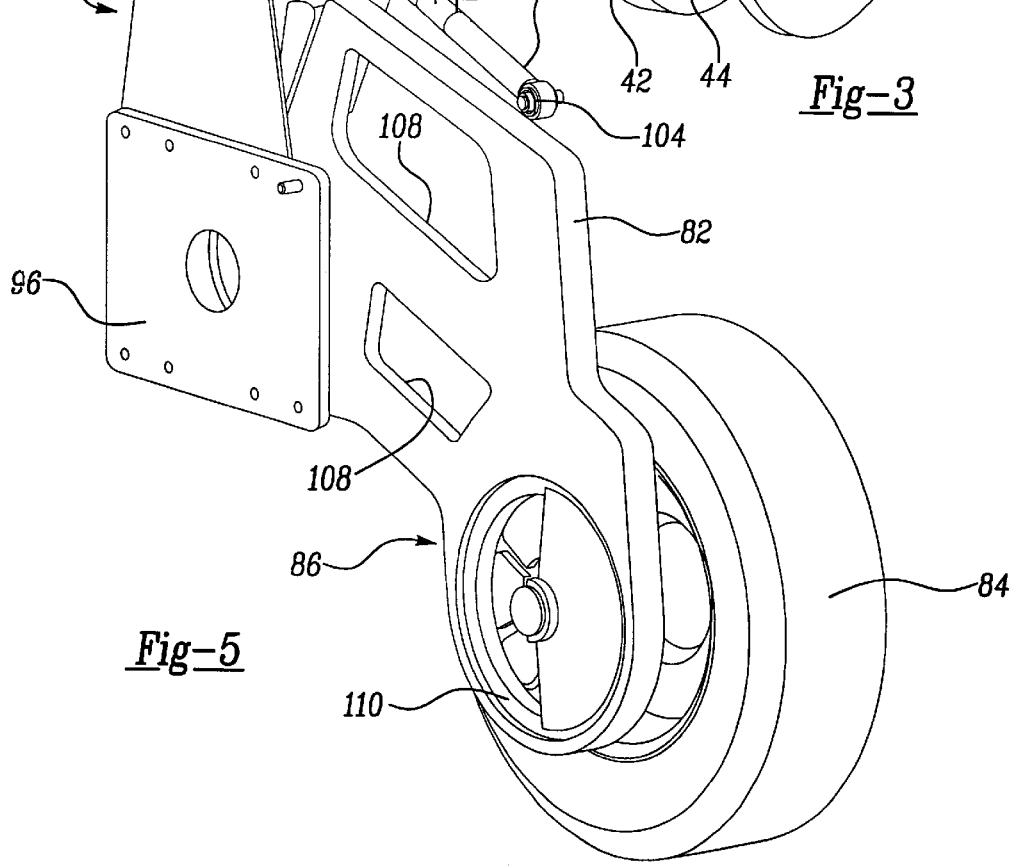
FIG. 5 is an inboard perspective view of the heavy duty suspension system arranged in accordance with the principals of a second embodiment of the present invention.
Figure 6:
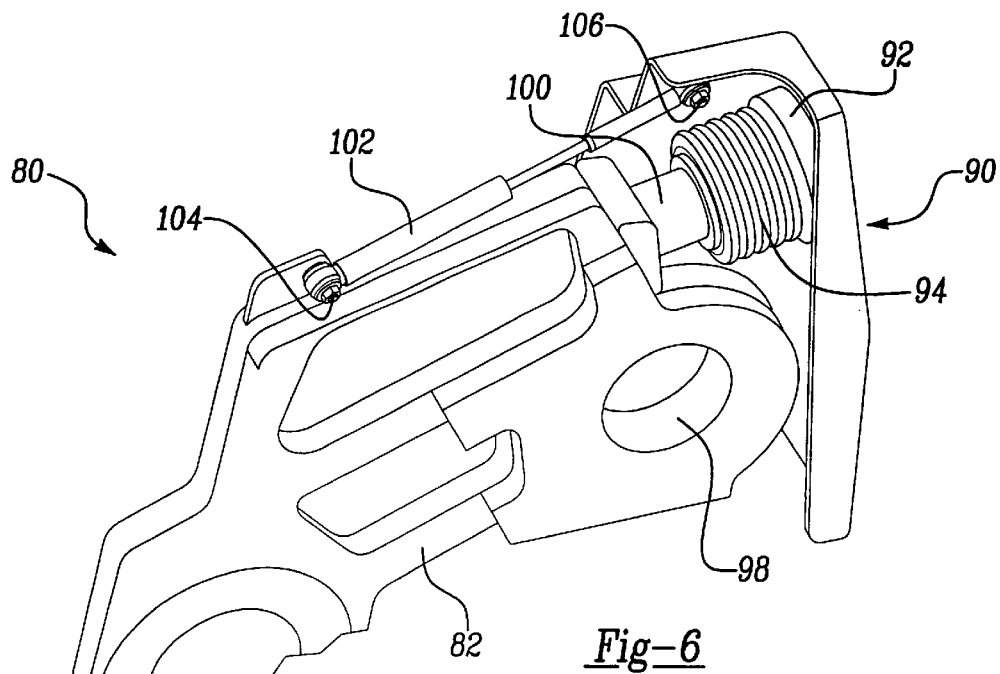
FIG. 6 is an outboard perspective view of the heavy duty suspension system of FIG. 5.
Figure 7:
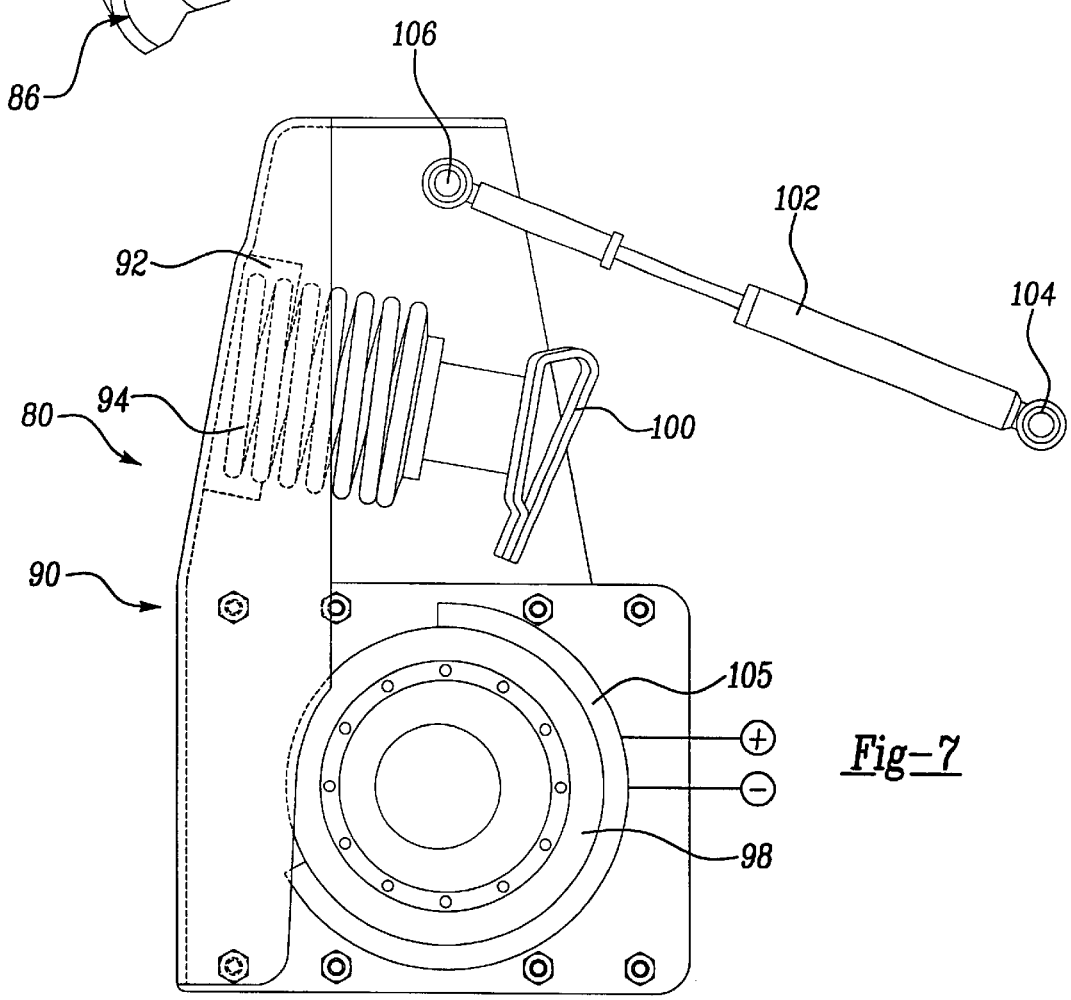
FIG. 7 is an elevational view of the heavy duty suspension system of FIGS. 5 and 6.

FIGS. 5–7 depict a suspension system 80 as might be embodied in a truck or other heavy duty vehicle. With reference to FIGS. 5–7, suspension system 80 comprises a suspension arm or frame 82 from which is suspended a drive wheel 84, motor assembly 86, and brake assembly, as shown in FIG. 1 at 18. Motor assembly 86 and brake assembly are analogous to motor assembly 16 and brake assembly 18 described with respect to FIGS. 1–4. As discussed above, suspension frame 82 may form a portion of the motor housing of motor assembly 86. Suspension frame 82 attaches to chassis mounting plate 96 which in turn attaches to the vehicle, such as vehicle 12 of FIG. 1. Chassis mounting plate 96 and suspension frame 82 interconnect via an annular suspension pivot bearing 98. Pivot bearing 98 preferably has a large diameter, for example, twelve inches. The large diameter of pivot bearing 98 distributes loads over a greater surface area, thereby better dispersing shock loads, with the purpose of reducing overall vehicle weight.

Suspension system 80 also includes a retaining spring and dampener which are attached to shock tower assembly 90. Shock tower assembly 90 includes a spring seat 92 which receives a spring, such as a coil spring. Opposite spring seat 92, spring 94 includes a contact pad 100. Spring 94 and contact pad 100 cooperate to exert a force on suspension frame 82 causing suspension frame 82 to rotate about pivot bearing 98 to exert a downward pressure on drive wheel 84. When drive wheel 84 experiences an upward force, such as when the vehicle 12 hits a bump in the road, spring 94 and contact pad 100 operate to resist rotational movement of suspension frame 82 about pivot bearing 98, urging drive wheel 84 back to its preferred position.

Suspension system 80 also includes a dampener 102. Dampener 102 connects to suspension frame 82 at dampener mount 104 and to shock tower assembly 90 at dampener mount 106. Dampener 102 operates as a conventional dampener, many of which are know to those skilled in the art. Dampener 102 provides dampening of rotational movement of suspension frame 82 about pivot bearing 98, thereby dampening generally vertical motion of drive wheel 84.

Suspension frame 82 includes cut-out sections 108 in order to reduce the weight of suspension frame 82 while maintaining suitable structural integrity of suspension frame 82. Preferably, suspension system 80 is mounted to a side frame rail of the chassis of vehicle 12 as can be seen with respect to FIG. 11. Further, suspension frame 82 is preferably mounted in a longitudinal direction with respect to the vehicle to minimize space requirements of suspension system 80. Further, as best seen with respect to FIG. 5, suspension frame 84 may be formed to include not only a housing for motor assembly 86, but may also allow access to motor assembly 86 through access opening 110.

The independent suspension and drive function of the systems of FIGS. 5–7 may combine linear and rotary regenerative functions directly with the suspension system and the drive unit. More particularly, with reference to FIG. 5, dampener 102 includes a regenerative device 103 which generates an electrical energy output across the positive and negative terminals in response to reciprocating movement of dampener 102. Regenerative device 103 provides a linear regenerative function. Similarly, FIG. 7 shows a regenerative device 105 which generates an electrical energy output across the positive and negative terminals in response to rotary motion of annular suspension pivot bearing 98. Regenerative device 105 provides a rotary regenerative function. One skilled in the art will recognize that the regenerative functions described with respect to FIGS. 5 and 7 may be incorporated into each suspension embodiment described herein.

In addition to the heavy duty suspension system shown in FIGS. 5–7, it is sometimes preferable to implement a suspension system having lighter duty requirements in order to reduce cost and to tailor the suspension system to the specific vehicle on which it is implemented.

Figure 8:
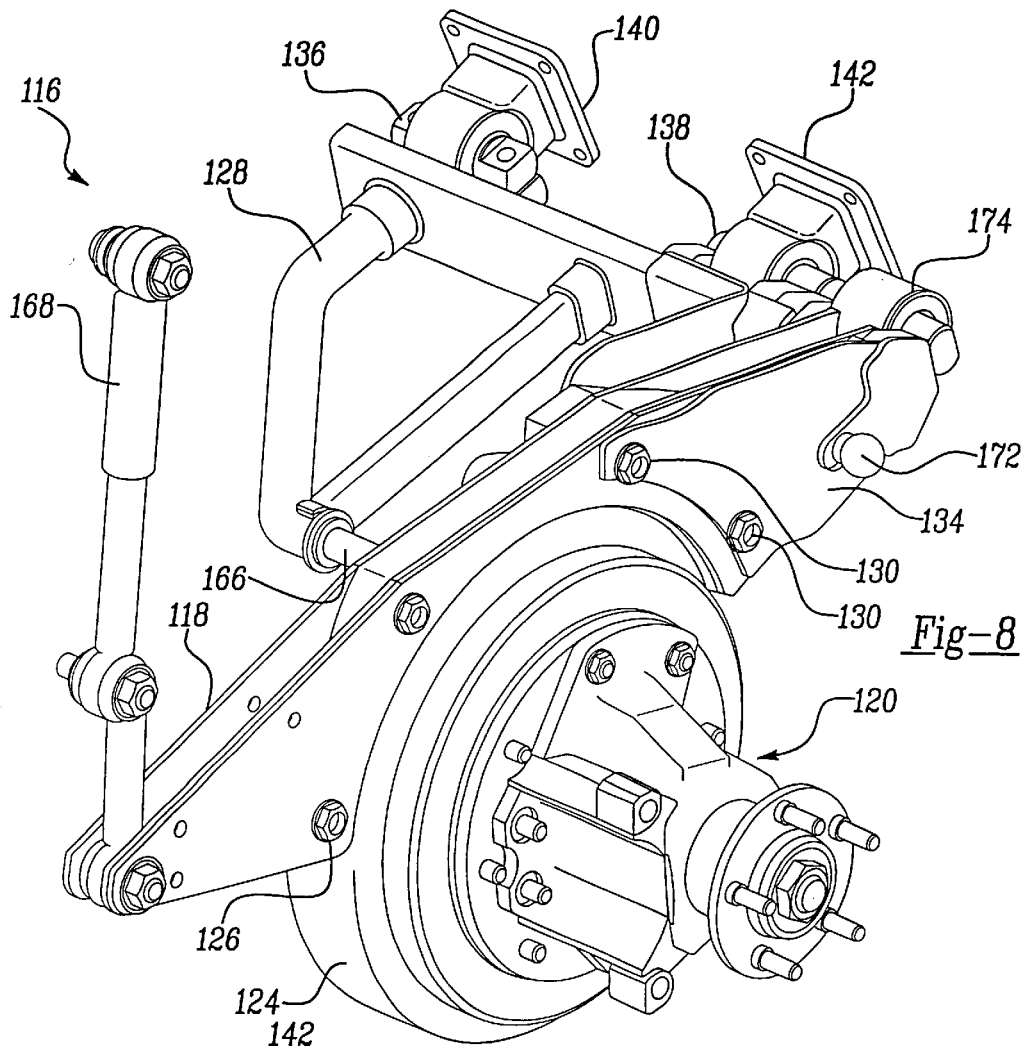
FIG. 8 is a forward perspective view of a second suspension system and motor assembly arranged in accordance with the principals of a third embodiment of the present invention.
Figure 9:
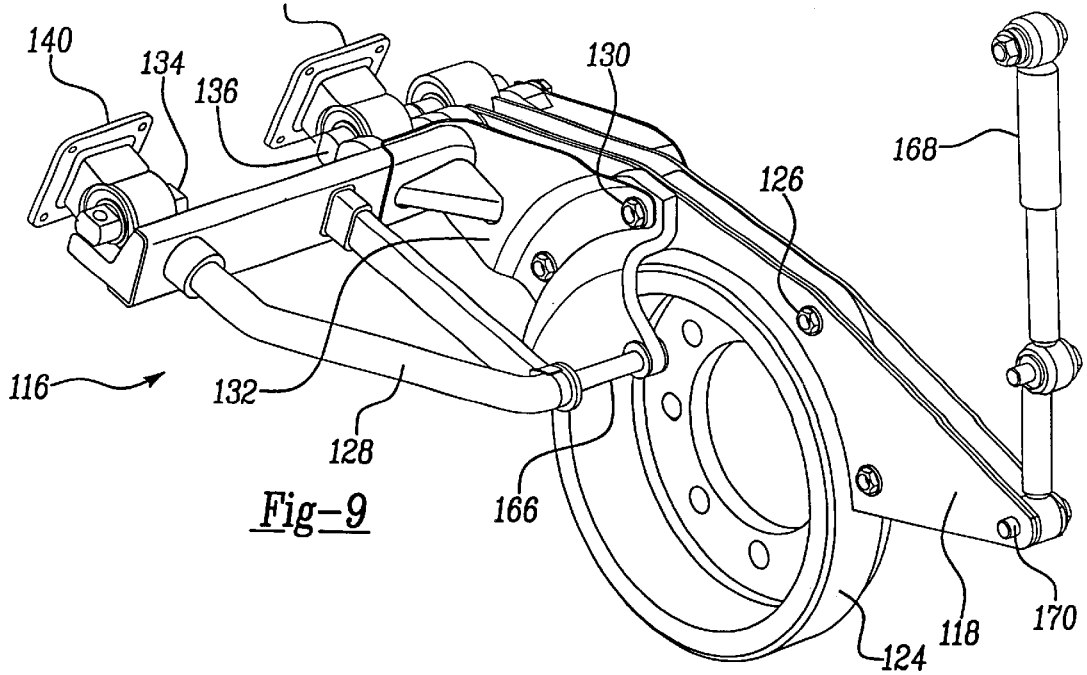
FIG. 9 is an inboard perspective view of the suspension of FIG. 8.
Figure 10:
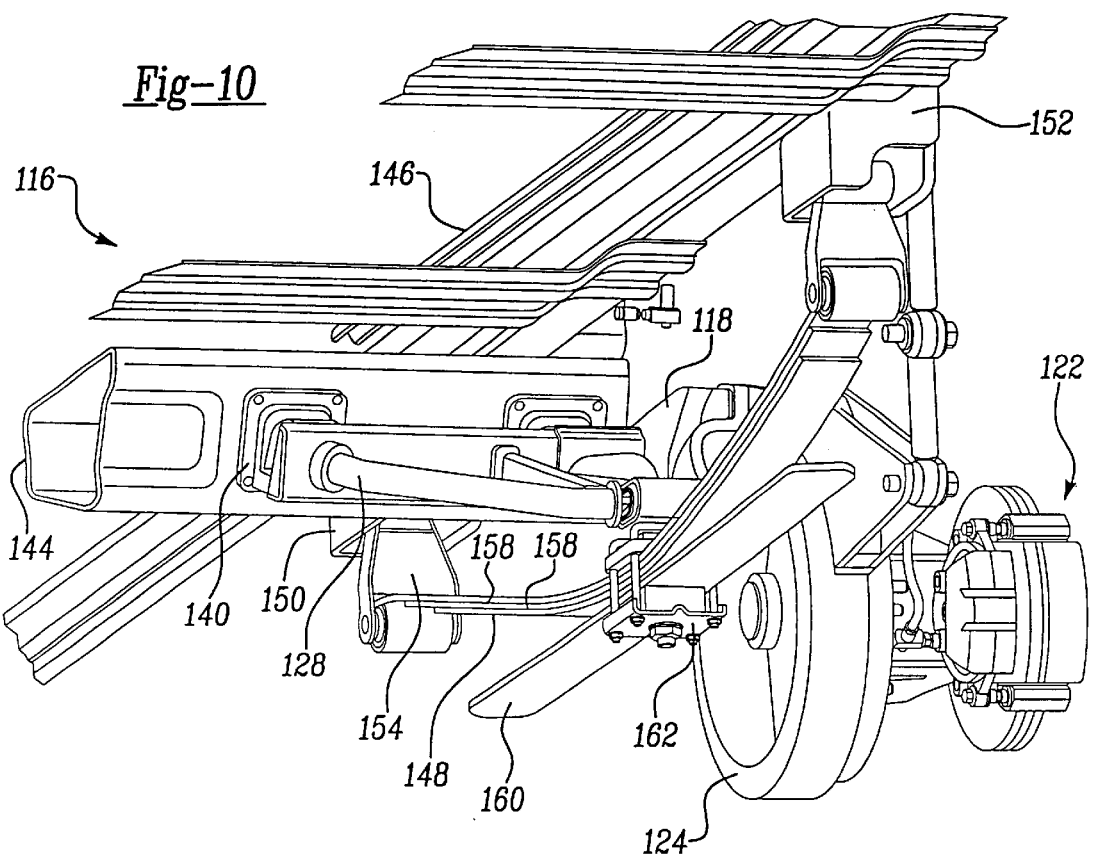
FIG. 10 is a forward perspective view of the suspension system of FIGS. 8 and 9 shown attached.

Accordingly, FIGS. 8–10 depict a light duty suspension system arranged in accordance with the principals of a third embodiment of the present invention. Light duty suspension system 116 includes a suspension arm 118 from which is suspended a motor assembly 120 and a brake assembly 122. Motor assembly 120 and brake assembly 122 are analogous to motor assembly 16 and brake assembly 18 described with respect to FIGS. 1–4. Motor assembly 120 is inserted within motor housing 124, which may be integrally formed with suspension arm 118 or may be attached to suspension arm 118 by a nut and bolt 126 or other suitable fastener. The particular configuration for forming motor housing 124 is selected in accordance with specific design considerations, as will be understood by those skilled in the art.

Suspension arm 118 connects to pivot arm 128. A pair of nut and bolt assemblies 130 or other suitable fasteners interconnect pivot arm 128, suspension arm 118, and angle bracket 132 so that the three move in unison during operation. Pivot arm 128 rigidly connects to suspension pivots 136, 138. Suspension pivots 136, 138 are supported by mounting brackets 140, 142 respectively, and connect to vehicle 12 via transverse member 144. Transverse member 144 connects to a chassis side rail 146 to effect connection to the vehicle. Suspension arm 118 pivots about suspension pivot 136, 138 to effect generally upward and downward movement of motor assembly 120.

A spring 148, such as a leaf spring, provides a retaining force to maintain suspension arm 118 generally in a predetermined position. Spring 148 connects to chassis side rails 146 via a pair of spring shackles 150, 152. Spring shackles 150, 152 enable attachment to chassis side rail 146 to enable movement of support tray as will be described herein. Spring shackles 150, 152 include an interconnect 154, 156, respectively, to accommodate coiling and recoiling of spring 148. Spring 148 typically comprises a plurality of leafs 158, but may also be embodied as a unispring, and a spring stop 160 which are bound together by spring clamp 162. At the upper end, spring clamp 162 includes a spring mount 164 which attaches spring 148 to pivot arm 128. Pivot arm 128 connects to spring 148 via mount pin 166. Spring mount 164 has a generally ovular shape in order to accommodate longitudinal movement of spring mount pin 166 with respect to spring mount 164.

Similar to FIGS. 5–7, suspension system 116 includes a dampener 168 attached to suspension arm 118 via nut and bolt fastener 170 or other known fasteners such as a clevis pin or the like. Dampener 168 dampens generally vertical movement of suspension system 116. At its upper end, dampener 168 connects to the vehicle at chassis side rail 146 via a shock mount, not shown.

In order to facilitate service of motor assembly 120, suspension system 116 provides for disconnecting suspension arm 118 from pivot arm 128 in order to lower suspension arm 118 and eliminate interference from pivot arm 128 and spring 148. To effect this disconnection, fasteners 130 are removed, and a lock pin 172, which passes through side bracket 134, suspension arm 118, and angle bracket 132, is removed to disengage the assembly. This enables suspension arm 118 to drop down independently of pivot arm 128. To enable suspension arm 118 to move independently of pivot arm 128 to achieve the service position, suspension arm 118 moves generally independently from suspension pivot 136 via a journal 174.

Figure 11:
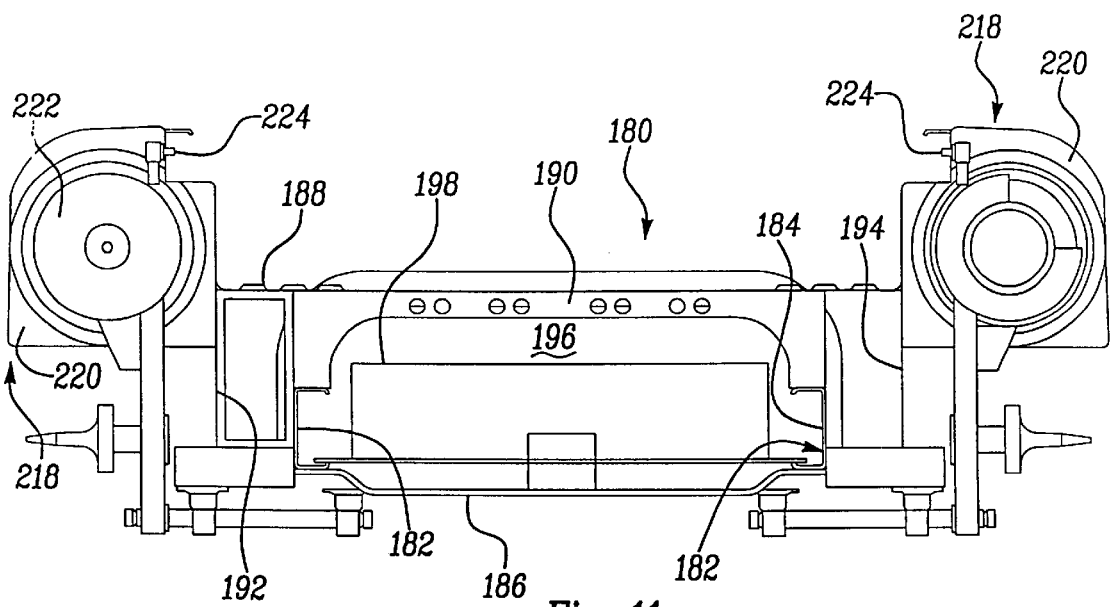
FIG. 11 is a partial perspective view of a vehicle having a removable battery carrier arranged in accordance with the principals of a fourth embodiment of the present invention.
Figure 12:
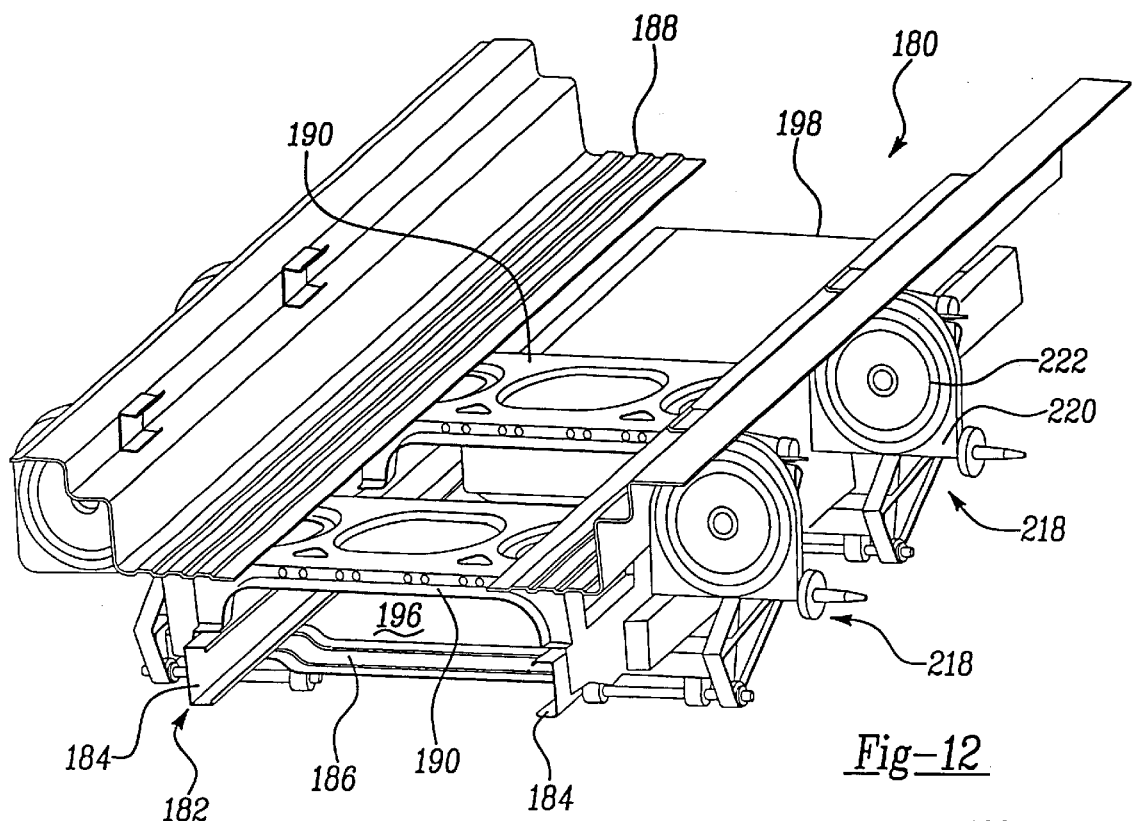
FIG. 12 is a rear elevational view of the vehicle FIG. 11.
Figure 13:
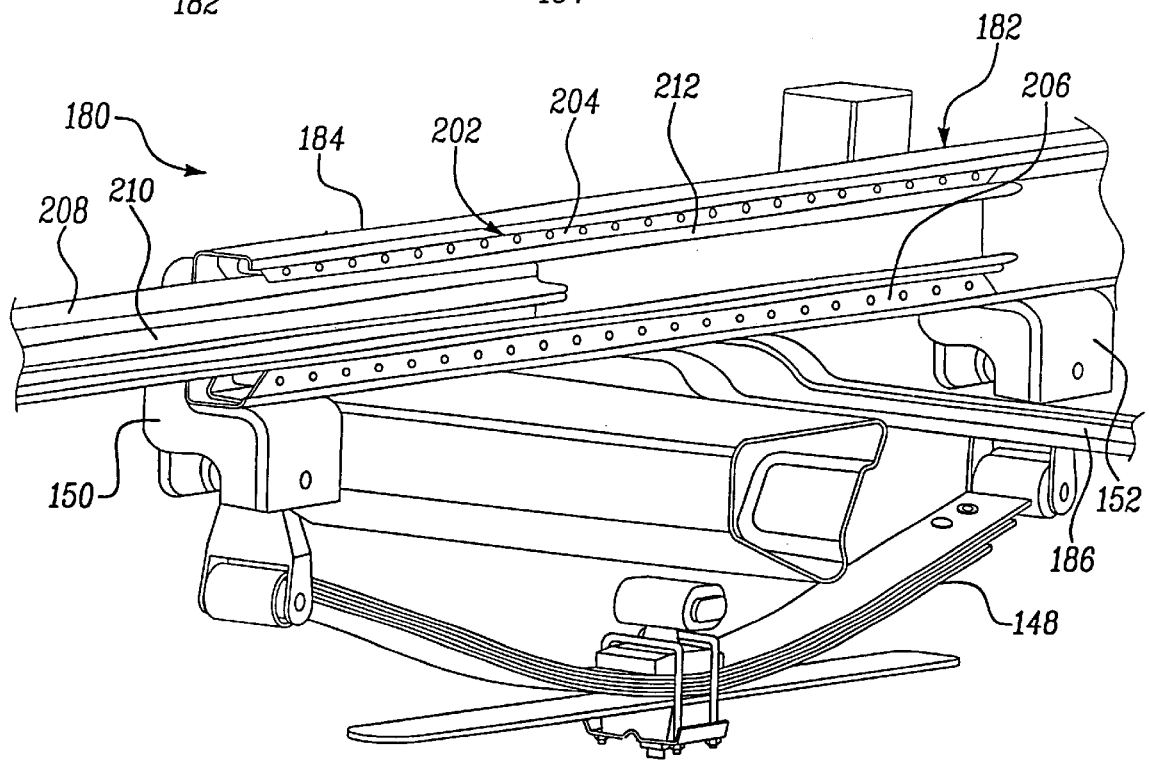
FIG. 13 is a rear perspective view of a roller assembly for facilitating removal of the carrier of FIGS. 11 and 12.

The motor and brake assembly embodiment, the heavy duty suspension embodiment, and the light duty suspension embodiment described herein have particular applicability to electric vehicles. A recurring design consideration in most electric vehicles is handling the bank of batteries, including positioning the batteries for use of access, service, and maximization of space. Accordingly, FIGS. 11–13 depict a fourth embodiment of the present invention in which a battery tray or other type of storage compartment is formed between the side rails of the vehicle chassis. It will be noted by one skilled in the art, that the embodiment described herein is particularly applicable to any vehicle in which the axles have been eliminated, as the side frame rails can be more readily configured as straight rails to facilitate installation and use of the embodiment described herein.

A vehicle 180, which is generally embodied herein as a truck, but may be a car, includes a chassis, 182 having longitudinal or side rails or members 184 and transverse or lower cross rails or member 188. As shown in FIG. 13, the rails also support a spring 148 connected to side rails 184 using spring shackles 150, 152, as described above with respect to FIGS. 8–10. Chassis 182 supports a cargo box or load floor 188 which may be formed of sheet metal, plastic, or other suitable materials. Cargo box or load floor 188 is supported by upper cross-members 190 which are in turn supported on side rails 184. Additional stability can be provided to chassis 182 by including a pair of torque boxes 192, 194 onto the outboard side of side rails 184. Torque boxes 192, 194 may be formed using a rolled material, such as plastic or metal, which may be stamped, molded, or formed using other techniques.

Lower cross-member 186, upper cross members 190, and side rails 184 define a tunnel 196 that provides storage space allowing suitable access. In particular, with respect to the present invention, tunnel 196 may be used to house a battery bank 198 that supplies electrical energy for operating an electric vehicle. Battery bank 198 rests on a platform 200. To facilitate access to battery bank 198, each side rail 184 is configured to include a roller assembly 202. Roller assembly 202 includes upper roller track 204 and lower roller track 206. Upper roller track 204 and lower roller track 206 cooperate to support slide 208. Slide 208 is inserted between upper roller track 204 and lower roller track 206 and enables movement in the direction of frame rails 184. Slide 208 includes a lip 210 which supports platform 200. Accordingly, battery bank 198 may be removed from beneath cargo box 188 by displacing the slide 210 in each frame rail 184, which supports battery bank 198, out from under cargo box 198. Further, roller assembly 202 includes a roller track 212 which engages slide 208 in order to maintain slide 208 within roller assembly 202.

One skilled in the art will recognize that while this embodiment has been described with respect to a platform 200 which holds a battery bank 198, tunnel 196 may be used to store any container, energy source for driving the vehicle, or other cargo and may be adapted to include closed containers, and the like.

FIGS. 11 and 12 also depict a modified representation of the shock tower as described with respect to FIGS. 5–7. In particular, shock tower assembly 218 includes a base plate 220 and a spring seat 222 for receiving a coil spring, as shown in FIGS. 5–7. Shock tower 218 also includes a shock mount 224 to enable mounting of a dampener assembly as described above with respect to FIGS. 5–7.

In a typical electric vehicle, large banks of batteries are employed to supply sufficient energy for prolonged time periods. Battery banks of the type to supply such electrical energy typically generate heat which degrades operation of the battery banks. Alternatively, battery bank performance may also be degraded in cold weather. Accordingly, a fifth embodiment of the present invention is directed to utilizing the side rails of the vehicle described herein in order to efficiently route fluid transfer lines from a radiator or other intercooler or a heat source, respectively, to the battery banks.

Figure 14:
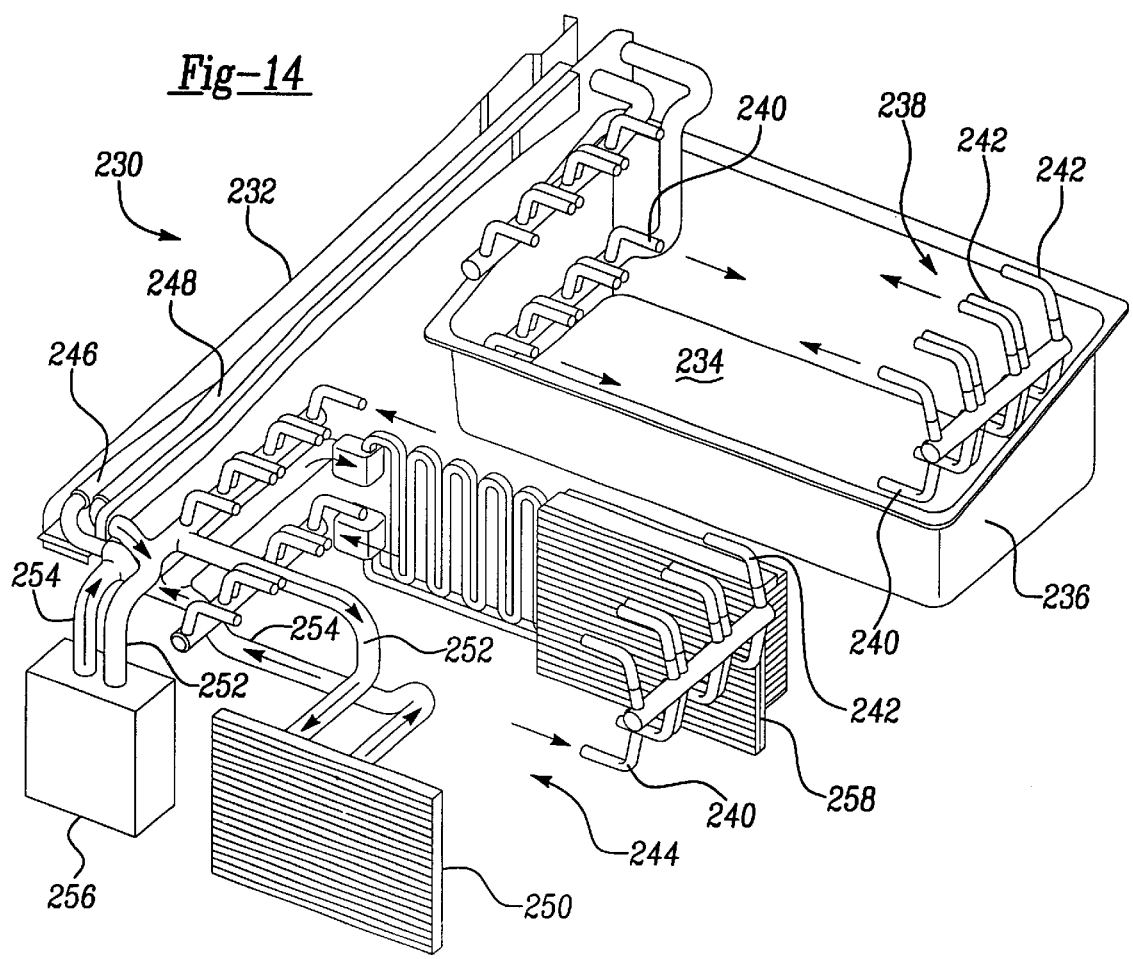
FIG. 14 is a partial perspective view of a cooling module in which coolant flows through pipes routed in the frame rail of a vehicle arranged in accordance with the principals of a fifth embodiment of the present invention.

With reference to FIG. 14, a portion of a vehicle 230 is shown including a side rail 232 of the frame or chassis. Vehicle 230 also includes a battery bank 234 housed in a battery container or tray 236. A plurality of temperature control lines 238 are arranged around battery bank 234 to effect thermal management of the battery banks via thermal management system 244. Temperature control lines 238 include a plurality of lower lines 240 and a plurality of upper lines 242. Lower lines 240 receive fluid from primary cooling system 250 or heating system 256 on primary supply line 254. Fluid is received from fluid supply or transfer line or transfer 246 and flows through temperature control lines 238 and returns to thermal management system 244 on fluid return or transfer line 248. Thermal management system 244 includes primary cooling system 250, intercooler system 258, and heater system 256, or any combination of these systems. Additional banks of batteries may be temperature managed similarly as described with respect to cooling lines 238 for battery bank 234. One skilled in the art will recognize that intercooler 258 is optionally included.

As shown in FIG. 14, side rail 232 provides a routing path for supply line 246 and return line 248, thereby advantageously utilizing side rail 232. This eliminates the need for additional plumbing apparatus for routing the supply line 246 and the return line 248 between battery bank 234 and thermal management system 244.

While specific embodiments have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed is:

1. An electric vehicle comprising:
    a frame formed of upper and lower transverse members and horizontally opposed, longitudinal members with respect to the vehicle;
    a battery tray disposed between the longitudinal and transverse members for supporting a bank of batteries for providing electric energy for operating the electric vehicle;
    a friction reducing device formed in the longitudinal members for supporting the battery tray between the longitudinal members, wherein the battery tray may be displaced longitudinally over the friction reducing device to facilitate access to the bank of batteries, wherein the longitudinal members are arranged so as to not obstruct displacement of the tray;
    a suspension bracket attached to the frame;
    a suspension arm coupled to the suspension bracket through an annular suspension pivot bearing allowing relative rotation between the suspension arm and suspension bracket, said annular suspension pivot bearing containing a regenerative device which generates an electrical energy output across a positive electrical terminal and a negative electrical terminal in response to relative rotation between the suspension arm and suspension bracket, the electrical energy being used to supplement electric energy of the bank of batteries;
    a motor housing integral to the suspension arm, the motor housing receiving an electric motor that applies displacing force to a drive wheel;
    a hydraulic brake mechanism mounted outboard of the motor housing.

2. The electric vehicle of claim 1 further comprising a load floor disposed upon and supported by the members.

3. The electric vehicle of claim 2 wherein the battery tray is disposed beneath the load floor.

4. The electric vehicle of claim 3 wherein the friction reducing device is arranged on the longitudinal members to maintain the battery tray generally parallel to the longitudinal members.

5. The electric vehicle of claim 4 further comprising a support member disposed on the friction reducing device, the support member supporting the battery tray.

6. The electric vehicle of claim 5 wherein the battery tray may be displaced to a position beyond ends of the opposing members.

* * * * *